United States Patent [19]

Fukushima

[11] Patent Number: 5,523,857
[45] Date of Patent: Jun. 4, 1996

[54] IMAGE SIGNAL RECORDING CONTROL IN ACCORDANCE WITH THE DETECTED STATE OR TYPE OF POWER SUPPLY

[75] Inventor: Nobuo Fukushima, Kanagawa-ken, Japan

[73] Assignee: Canon Kabushiki Kaisha, Tokyo, Japan

[21] Appl. No.: 432,533

[22] Filed: May 1, 1995

Related U.S. Application Data

[63] Continuation of Ser. No. 121,505, Sep. 16, 1993, abandoned.

[30] Foreign Application Priority Data

Sep. 22, 1992 [JP] Japan .................................. 4-252892

[51] Int. Cl.[6] ................................................ H04N 5/781
[52] U.S. Cl. ...................... 358/342; 358/906; 358/909.1; 348/730; 360/33.1
[58] Field of Search .................................. 358/335, 342, 358/906, 909.1; 348/730; 360/33.1; H04N 5/76, 5/781

[56] References Cited

U.S. PATENT DOCUMENTS

| | | | |
|---|---|---|---|
| 4,480,278 | 10/1984 | Maeda | 348/730 |
| 4,691,523 | 9/1987 | Silver | 358/335 |
| 4,928,137 | 5/1990 | Kinoshita | 348/372 |
| 5,012,334 | 4/1991 | Etra | 358/311 |
| 5,150,219 | 9/1992 | Fukushima | 358/335 |
| 5,200,863 | 4/1993 | Orii | 360/33.1 |

*Primary Examiner*—Tommy P. Chin
*Assistant Examiner*—Khoi Truong
*Attorney, Agent, or Firm*—Fitzpatrick, Cella, Harper & Scinto

[57] ABSTRACT

An image signal recording apparatus includes a first storage device arranged to receive image data and to temporarily store the image data inputted, and a second storage device which has a moving part arranged to record on a recording medium the image data temporarily stored at the first storage device. The apparatus is arranged such that, in moving the moving part of the second storage device after receipt of an instruction for starting to input the image data, the timing of starting the movement of the moving part of the second storage device is controlled according to the state of a power supply or a type of power supply which supplies electric power to portions of the apparatus. The apparatus thus can be simply arranged to be capable of continuously and stably recording image data by consuming only a small amount of electric energy.

8 Claims, 3 Drawing Sheets

IMAGE SIGNAL RECORDING CONTROL IN ACCORDANCE WITH THE DETECTED STATE OR TYPE OF POWER SUPPLY

This application is a continuation of application Ser. No. 08/121,505 filed Sep. 16, 1993, now abandoned.

BACKGROUND OF THE INVENTION

1. Field of the Invention

This invention relates to an image signal processing apparatus for processing image signals, and more particularly to an image signal processing apparatus arranged to store image signals on a recording medium.

2. Description of the Related Art

Among known image signal processing apparatuses for processing image signals, electronic still video systems are arranged to record image signals, for example, in a plurality of recording tracks concentrically formed on a magnetic disk, and to reproduce the image signals recorded in a selected recording track by selecting the recording track as desired.

The electronic still video systems have been arranged to record the image signals in the recording tracks on the magnetic disk as analog signals. However, there has recently appeared such a system that is arranged to convert into a digital signal an image signal obtained by taking a shot of an object, and to store the digital image signal on a memory card which has a plurality of random access memories (RAMs) built therein.

In digitizing the image signal and storing the digital image signal on a memory card, the memory card must have a large storage capacity, as the digital image signal has a large amount of information. At present, however, a memory card having a large storage capacity is expensive and the above-stated new system results in a very high cost.

In view of the high cost, it is being contemplated these days to arrange a system to use a hard disk which is less expensive than the memory card and yet has a large storage capacity, and to store a digitized image signal on the hard disk.

In digitizing an image signal obtained from an object image picked up by a video camera or the like and storing the digitized image signal on a hard disk, the system using the hard disk takes time before the rotation of the hard disk is stabilized to permit a storing action on the hard disk. Therefore, it has been necessary to allow the hard disk to rotate until the rotation of the hard disk is stabilized in a standby state before commencement of shooting and recording, or to provide the system with a buffer memory which is arranged to temporarily store the digitized image signal or image data which corresponds to an image picked up by a video camera. The image data is then read out from the buffer memory to transfer the read-out image data to the hard disk and to store the image data on the hard disk after the rotation of the hard disk becomes stable.

However, if the hard disk is allowed to continuously rotate during the standby period before the shooting and recording action, the consumption of electric energy increases. For example, in a case where power is to be supplied to the system from a portable power source such as a battery or the like, the system using the hard disk has necessitated frequent replacement of the battery. Further, in performing a continuous shooting and recording action by which image signals continuously supplied from a video camera are to be continuously stored on the hard disk, the electric energy remaining in the battery might be used up so as to bring the continuous shooting and recording action to a stop halfway and before completion of it.

SUMMARY OF THE INVENTION

It is a general object of the present invention to provide an image signal processing apparatus which is capable of solving the problems mentioned above.

It is a more specific object of the invention to provide an image signal processing apparatus which is simply arranged and consumes only a small amount of electric energy.

Under this object, an image signal processing apparatus arranged to process image signals according to the invention as an embodiment thereof comprises first storage means for temporarily storing inputted image data and outputting the stored image data, second storage means having a moving part for recording on a recording medium the image data outputted from the first storage means, instruction means for giving an instruction for starting to input the image data to be supplied to the first storage means, and action control means for causing the moving part of the second storage means to move after the instruction for starting to input the image data is given by the instruction means, the action control means being arranged to control timing of starting the movement of the moving part of the second storage means according to a state of a power supply arranged to supply electric power to portions of the image signal processing apparatus.

It is another object of the invention to provide an image signal processing apparatus which is capable of stably carrying out a continuous recording action on image signals with a simple arrangement.

Under that object, an image signal processing apparatus arranged to process image signals according to the invention as an embodiment thereof comprises first storage means for temporarily storing inputted image data and outputting the stored image data, second storage means having a moving part for recording on a recording medium the image data outputted from the first storage means, instruction means for giving an instruction for starting to store the image data supplied to the first storage means, and action control means for causing the moving part of the second storage means to move after the instruction for starting to store the image data is given by the instruction means, the action control means being arranged to control timing of starting the movement of the moving part of the second storage means according to a kind of power supply arranged to supply electric power to each part of the image signal processing apparatus.

These and other objects and features of the invention will become apparent from the following detailed description of an embodiment thereof taken in connection with the accompanying drawings.

DETAILED DESCRIPTION OF THE PREFERRED EMBODIMENT

Figure 1:
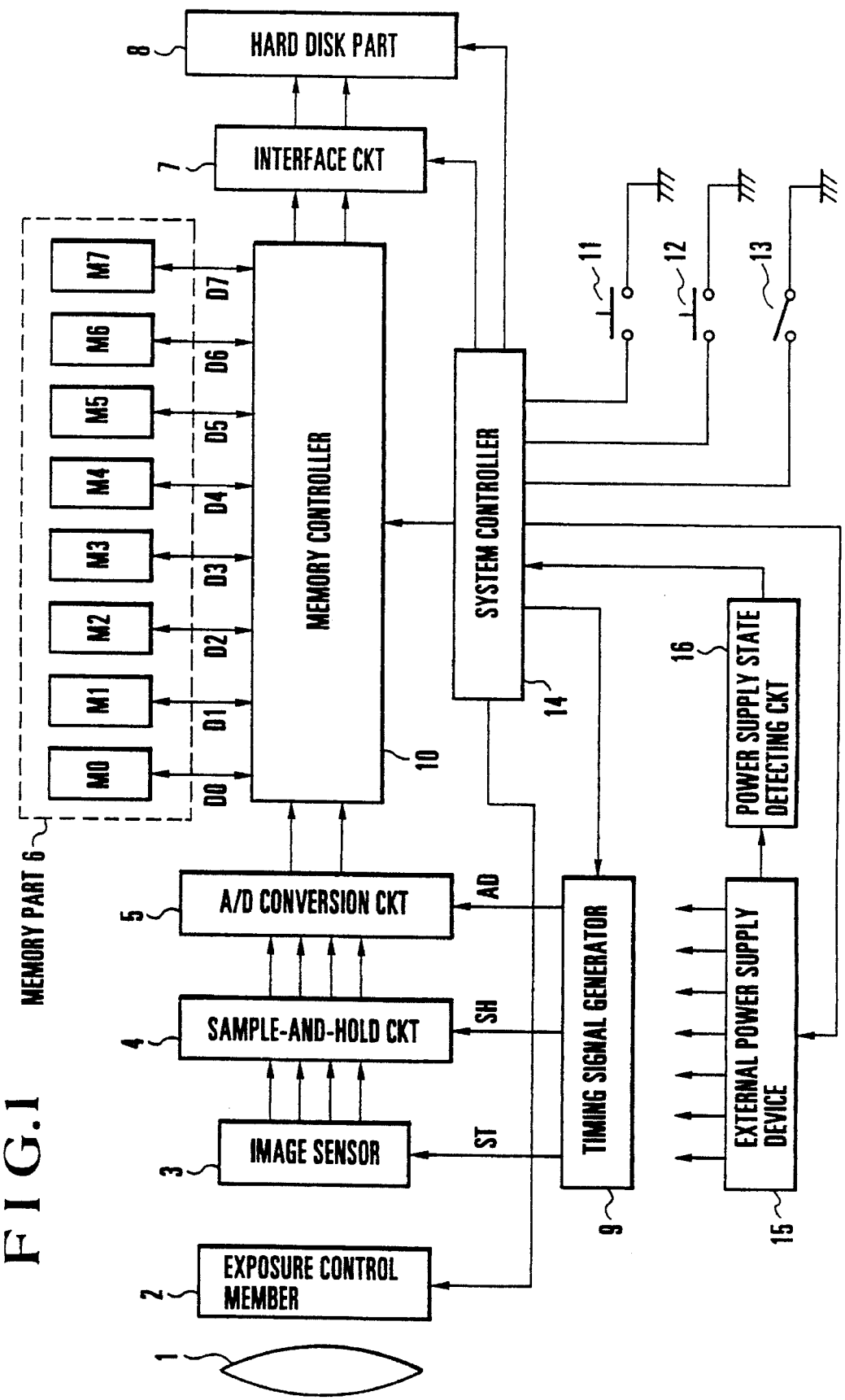
FIG. 1 is a block diagram showing in outline the arrangement of an electronic still video system according to this invention as a first embodiment thereof.

The following describes the present invention through an embodiment thereof:

Referring to FIG. 1, an optical system 1 is formed by a photo-taking lens. An exposure control member 2 is formed by an iris mechanism, a shutter mechanism, etc. Reference numeral 3 denotes an image sensor. A sample-and-hold circuit 4 is arranged to sample and hold an analog image signal generated by the image sensor 3. An analog-to-digital (A/D) conversion circuit 5 is arranged to convert the analog image signal outputted from the sample-and-hold circuit 4 into digital image data. A memory part 6 comprises a plurality of buffer memories M0 to M7 which are D-RAMs (dynamic random access memories) or the like. A digital interface circuit 7 is arranged to supply the image data outputted from the memory part 6 to a hard disk part 8. The hard disk part 8 includes a hard disk device and is arranged to store (or record) on a hard disk the image data which is outputted from the memory part 6 and supplied via the digital interface circuit 7. A timing signal generator 9 is arranged to generate timing signals of varied kinds including a driving pulse signal ST for driving the image sensor 3, a sample-and-hold pulse signal SH for controlling the sample-and-hold action of the sample-and-hold circuit 4, and a clock pulse signal AD for controlling the converting action of the A/D conversion circuit 5. A memory controller 10 is arranged to control image data storing and reading actions and a D-RAM refreshing action on the memory part 6. The electronic still video system is provided with a first release switch 11 (SW1), a second release switch 12 (SW2), and a lock switch 13 which is arranged to inhibit instructions from being given by these release switches SW1 and SW2, etc. A system controller 14 is arranged to control the operation of the whole system. An external power supply device 15 is arranged to supply electric power to portions of the system. The power supply device 15 is composed of a secondary battery or an AC/DC converter which is arranged to supply each part with the power obtained by converting the AC current of a power line or the like into a DC current.

A power supply state detecting circuit 16 is arranged to provide the system controller 14 with information on the state of the power supply obtained by measuring the voltage of the power outputted from the external power supply device 15 or the impedance or the like of the external power supply device 15.

The specifications of the hard disk part 8 of this embodiment are as follows: The hard disk part 8 is provided with, for example, a general purpose hard disk device manufactured by a company called "CONNER" or "AREAL". The hard disk device has three modes including an active mode, a power save mode, and a standby mode.

In the active mode, the hard disk is rotating in process of reading data, writing data, seeking a sector, or the hard disk device is rotating in an idle state in process of waiting for a next command.

In the power save mode, a head is in a retracted position away from the hard disk while the hard disk is rotating. It takes about several hundreds of milliseconds to shift the power save mode to the active mode.

In the standby mode, the hard disk is not rotating. A shift from the standby mode to the active mode requires a longer period of time than a shift from the power save mode to the active mode.

Generally, a hard disk device has a function of automatically shifting either to the power save mode or to the standby mode if the action of writing data, reading data or seeking a sector is not performed for a certain period of time in the active mode. However, in the case of this embodiment, the hard disk device is assumed to immediately shift to a desired mode upon receipt of a command, without using that function.

Figure 2:
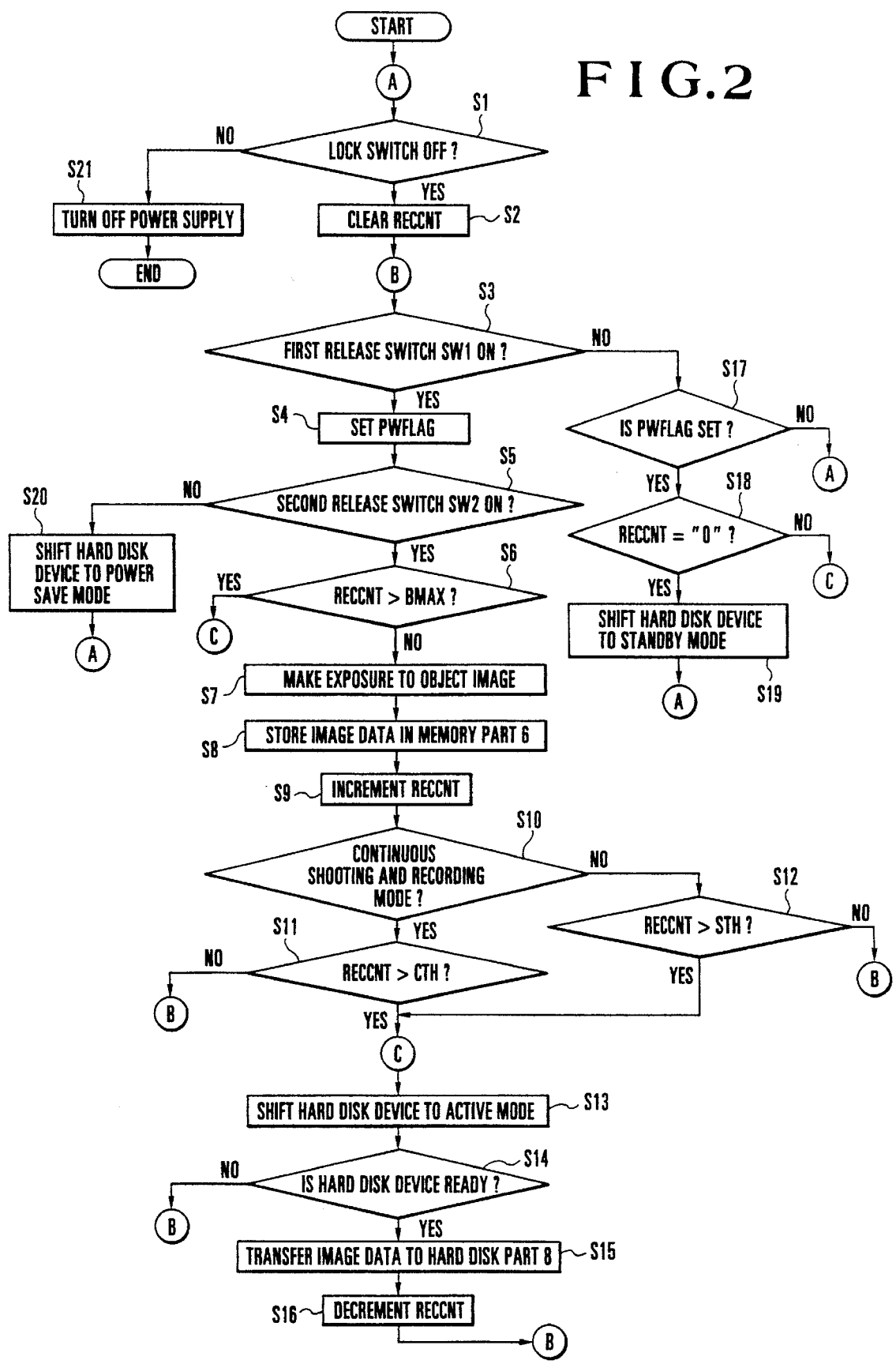
FIG. 2 is a flow chart showing the flow of a shooting and recording action of the electronic still video system shown in FIG. 1.

The shooting and recording action of the electronic still video system which is arranged as shown in FIG. 1 is described below with reference to FIG. 2:

FIG. 2 is a flow chart showing the flow of the shooting and recording action of the electronic still video system shown in FIG. 1. Referring to FIG. 2, at steps S1 and S2, when the lock switch 13 is found to be in an off-state, the count value of a counter (hereinafter referred to as RECCNT) which is arranged within the system controller 14 to count the number of shots of images corresponding to the image data stored in the memory part 6 is cleared to zero. If the lock switch 13 is found at the step S1 to be in an on-state, the flow comes to a step S21. At the step S21, the system controller 14 turns off the external power supply device 15.

At steps S3 and S4, the system controller 14 checks the first release switch SW1 for its state. If the first release switch SW1 is found to be on, the external power supply device 15 is caused to begin to supply electric power to the hard disk part 8 and, at the same time, a flag (hereinafter referred to as PWFLAG) indicating that the power is being supplied from the external power supply device 15 to the hard disk device 8 is set.

At steps S5 and S20, the system controller 14 checks the second release switch SW2 for its state. If the second release switch SW2 is found to be off, a power save command is sent to the hard disk device within the hard disk part 8. Upon receipt of the power save command, the mode of the hard disc device begins to shift to the above-stated power save mode. At steps S5 and S6, if the second release switch SW2 is found at the step S5 to be on, the flow comes to the step S6 to check the buffer memories of the memory part 6 for an overflow. The value of a maximum storable number of shots of images corresponding to the image data which can be stored in the memory part 6 is assumed to be BMAX. The check for the overflow of buffer memories arranged within the memory part 6 is made by checking the counter RECCNT to find if its count value has exceeded the value BMAX.

Steps S6 to S9: If the count value of the counter RECCNT is found to not exceed the value BMAX, the image pickup plane of the image sensor 3 is exposed to the image of an object by controlling the shutter mechanism of the exposure control member 2. An image signal outputted from the image sensor 3 is sampled and held by the sample-and-hold circuit 4. The output of the sample-and-hold circuit 4 is digitized by the A/D conversion circuit 5 into digital image data. The digital image data is supplied to the memory part 6 via the memory controller 10 to be stored in an applicable buffer memory arranged within the memory part 6. The count value of the counter RECCNT which is disposed within the system controller 14 is incremented. A count value of the number of shots of images corresponding to the image data stored in the buffer memories within the memory part 6 is thus stored within the system controller 10.

For these actions mentioned above, the image sensor 3, the sample-and-hold circuit 4, and the A/D conversion circuit 5 are driven respectively by means of the driving pulse signal ST, the sample-and-hold pulse signal SH and the clock pulses signal AD which are outputted from the timing signal generator 9.

At a step S10, a shooting and recording mode which is set by operating an operation part (not shown) is checked to find whether it is a continuous shooting and recording mode or a single shooting and recording mode. If it is found to be the continuous shooting and recording mode, the flow comes to a step S11 to find if the count value of the counter RECCNT exceeds a predetermined number-of-stored-shots value CTH. If the mode is found at the step S10 to be a single shooting and recording mode, the flow comes to a step S12 to find if the count value of the counter RECCNT exceeds a predetermined number-of-stored-shots value STH. Incidentally, the predetermined number-of-stored-shots value CTH for the continuous shooting and recording mode is set at a larger value than the predetermined number-of-stored-shots value STH for the single shooting and recording mode.

If the count number of the counter RECCNT is found to be exceeding the value CTH or STH at the step S11 or at the step S12, the flow comes to a step S13. At the step S13, the system controller 14 sends an active command to the hard disk device disposed within the hard disk part 8. Upon receipt of the active command, the mode of the hard disk device shifts to the above-stated active mode to cause the hard disk to begin to rotate. If the count number of the counter RECCNT is found to be not exceeding the value CTH or STH at the step S11 or S12, the flow of operation comes back to a routine (B) shown in FIG. 2 for a next shooting and recording action.

At a step S14, a check is made to find if the hard disk device is ready, i.e., if the rotation of the hard disk of the hard disk device has become stable to enable the image data to be written in the hard disk. If not, the flow returns to the routine (B). If so, the flow comes to a step S15. At steps S15 and S16, the image data stored at the buffer memories within the memory part 6 is transferred to the hard disk part 8. Then, the count value of the counter RECCNT disposed within the system controller 14 is decremented as much as the number of shots of images corresponding to the image data transferred from the memory part 6 to the hard disk part 8. The flow then comes back to the routine (B).

Further, if the system controller 14 finds that the first release switch SW1 is to be off at the step S3, the flow comes to a step S17. At the step S17, the system controller 14 checks the above-stated flag PWFLAG to find if the flag PWFLAG is set. If not, it is assumed that no shooting and recording action has been performed as yet and the flow comes back to routine (A) as shown in FIG. 2. If so, the count value of the counter RECCNT is checked at a step S18. If the count value of the counter RECCNT is found to be not "0", it is assumed that there still remains some image data in the memory part 6, and the flow branches to a routine (C), as shown in FIG. 2, to execute the routine of recording the image data on the hard disk. If the count value of the counter RECCNT is found to be "0", it is assumed that all the image data stored in the memory part 6 has been transferred to the hard disk part 8 and recorded on the hard disk. In this instance, a standby command is sent to the hard disk device of the hard disk part 8 to cause the hard disk device to shift to the above-stated standby mode at a step S19. The flow comes back to the routine (A).

In the electronic still video system which is arranged according to the invention as described above, the hard disk device disposed within the hard disk part 8 is arranged to start up, during the process of a shooting and recording action, when the number of shots of images corresponding to the image data stored in the buffer memories within the memory part 6 comes to exceed the predetermined number-of-stored-shots value CTH (for the continuous shooting and recording mode) or the predetermined number-of-stored-shots value STH (for the single shooting and recording mode). Further, these predetermined number-of-stored-shots values CTH and STH are set according to the state of a power supply.

A setting action to be performed by the electronic still video system shown in FIG. 1 for setting a predetermined number-of-stored-shots value of images corresponding to image data stored in the memory part 6 is described below with reference to FIG. 3 which is a flow chart showing the flow of the action:

The predetermined number-of-stored-shots value of images corresponding to image data stored in the memory part 6 is set according to the state of a power supply and each shooting and recording mode.

Figure 3:
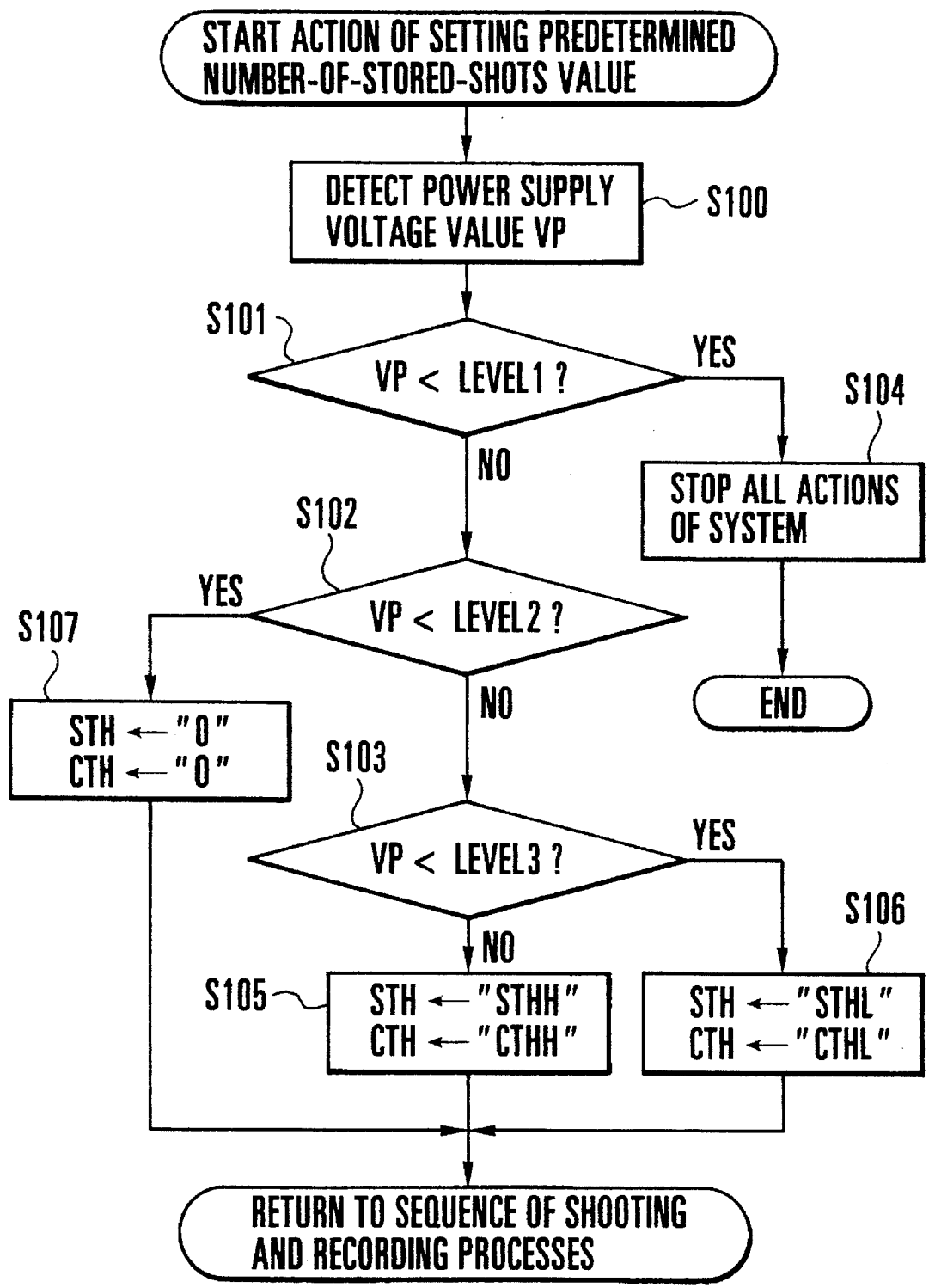
FIG. 3 is a flow chart showing the flow of an action of setting, according to the state of a power supply and each shooting mode, a predetermined number-of- stored-shots value of images which correspond to image data to be stored in a memory part of the electronic video system shown in FIG. 1.

At a step S100 of FIG. 3, the power supply state detecting circuit 16 detects a voltage value VP of the power outputted from the external power supply device 15. The detected power supply voltage value VP is sent to the system controller 14. At a step S101, the system controller 14 checks the power supply voltage value VP of the external power supply device 15 received from the power supply state detecting circuit 16 to find if it is lower than a voltage value LEVEL1 which is lower than a minimum voltage necessary for operating the system. If so, the flow comes to a step S104 to immediately stop the whole system from operating.

If the power supply voltage value VP is found to be higher than the voltage value LEVEL1 (at the step S101) and to be lower than a voltage value LEVEL2 necessary for new shooting and recording processes for several images (at a step S102), the system controller 14 judges the power outputted from the external power supply device 15 to have a sufficient voltage value for transferring the image data stored in the memory part 6 to the hard disk part 8 although it is insufficient for new shooting and recording processes. Then, the flow comes to a step S107 to set both the values STH and CTH at "0".

If the power supply voltage value VP is found at the step S102 to be higher than the voltage value LEVEL2 and found at a step S103 to be lower than a voltage value LEVEL3 which is sufficient for normal shooting and recording, the system controller 14 judges the power outputted from the external power supply device 15 to be at a sufficient voltage value for newly taking several shots and recording them. In that case, the flow comes to a step S106 to set the value STH at "STHL" and the value CTH at "CTHL". Incidentally, the set values "STHL" and "CTHL" are relatively small values. If the power supply voltage value VP is found at the step S103 to be higher than the voltage value LEVEL3, the flow comes to a step S105 on the assumption that the power outputted from the external power supply device 15 has a sufficiently high voltage value for normal shooting and recording. At the step S105, the value STH is set at "STHH" and the value CTH at "CTHH". These set values "STHH" and "CTHH" are sufficiently higher than the set values "STHL" and "CTHL" and are lower than the value BMAX.

The system controller 14 is programmed either to suitably execute the sequence of processes for setting the values CTH and STH during the sequence of the processes of shooting and recording described above and, after that, to come back to the flow of the original sequence of processes or to execute the sequence of the processes of setting the values CTH and STH by interrupting the sequence of the shooting and recording processes.

Since the predetermined number-of-stored-shots values CTH and STH which are set for controlling the timing of start-up of the hard disk device within the hard disk part 8 are varied according to the state of the power outputted from the external power supply device 15 in the manner as described above, the timing of start-up of the hard disk device can be controlled in an optimum manner according to the state of the external power supply device 15.

The embodiment is arranged to measure stepwise the state of the voltage value of the power outputted from the external power supply device 15 by three steps set at values LEVEL1, LEVEL2 and LEVEL3. However, the method of measuring the state of the power may be changed either to decrease or increase the number of steps as desired.

The embodiment is arranged to set both the values CTH and STH at "0" when the power supply voltage value VP is larger than the voltage value LEVEL1 and less than the voltage value LEVEL2. This arrangement may be changed to set the value CTH at "0" when the voltage value VP is larger than the value LEVEL2 and less than the value LEVEL3 and to set the value STH at "0" when the voltage value VP is larger than the value LEVEL1 and less than the value LEVEL2. In other words, the predetermined number-of-stored-shots values CTH and STH may be arranged to be set at "0" at different power supply voltage values VP instead of at the same voltage value.

In the case of the embodiment described, the state of the power supply is decided by measuring the voltage value of the power outputted from the external power supply device 15 at the power supply state detecting circuit 16. However, this arrangement may be changed to decide the state of the power supply by measuring the impedance of the external power supply device 15.

While nothing has been mentioned in particular about the kind of the external power supply device 15 in the foregoing description of the embodiment, the set values LEVEL1, LEVEL2 and LEVEL3 may be varied according to the kind of the external power supply device 15 by detecting the kind of power supply. In a case where, for example, the external power supply device 15 is a so-called two-way type power supply arranged to permit use of either a power line or a secondary battery, if the power line is used as the power source, the value LEVEL1 is set at 6 V and the values LEVEL2 and LEVEL3 at 7 V. If the secondary battery is used as the power source, the value LEVEL1 is set at 4.5 V, the value LEVEL2 at 6 V and the value LEVEL3 at 7 V. Further, the timing of start-up of the hard disk device can be controlled in an optimum manner by arranging the embodiment to vary the set values STHL, STHH, CTHL, and CTHH as well as those the values LEVEL1, LEVEL2, and LEVEL3 according to the kind of the external power supply device.

In the electronic still video system arranged as the embodiment of the invention described above, with the first release switch SW1 turned on, the image data which is obtained by digitizing the output of the image sensor 3 through the A/D conversion circuit 5 is stored in the buffer memories within the memory part 6. When the amount of the image data stored in the buffer memories reaches a predetermined number-of-stored-shots value, an action of rotating the hard disk begins within the hard disk part 8. Further, the predetermined number-of-stored-shots value which is a setting value to be used for controlling the timing of start-up of the hard disk device is varied according to the state of the external power supply device 15 and each shooting and recording mode. That arrangement permits optimum control over the timing of start-up of the hard disk device according to the state of the external power supply device 15. The arrangement obviates the necessity of keeping the hard disk of the hard disk device in a rotating state during the standby mode for shooting and recording, so that the electric energy can be saved by preventing an unnecessary increase in consumption of the electric energy. In a case where power is to be supplied to the apparatus from a portable power source such as a battery, the power saving arrangement makes it no longer necessary to frequently replace the battery. In the continuous shooting and recording mode, the power from the external power supply device 15 never suddenly drops to cause a continuous shooting and recording action to be suspended while the action is in process. The continuous shooting and recording action, therefore, can be stably carried out. Further, the arrangement for varying the above-stated predetermined number-of-stored-shots value according to the shooting and recording mode, the operating mode of the hard disk device within the hard disk part 8 and the state of the external power supply device 15 permits shortening a period of time during which the apparatus must be in a standby state by keeping the hard disk in a rotating state.

In accordance with the arrangement of the embodiment of the invention described above, an image signal processing apparatus can be simply arranged to lessen the electric energy consumption and to be capable of continuously recording image signals in a stable manner.

What is claimed is:

1. An image signal recording apparatus capable of receiving power supply from plural different kinds of power sources to record image signals, comprising:

first storage means for temporarily storing received image data and outputting stored image data;

second storage means having a moving part, for recording on a recording medium the image data outputted from said first storage means;

instruction means for giving an instruction for starting to enter the image data to said first storage means; and control means for causing the moving part of said second storage means to move after the instruction for starting to enter the image data is given by said instruction means, said control means controlling a timing of starting a movement of said moving part of said second storage means with a start of the storing operation of said second storage means according to (i) the kinds of power sources supplying power to respective parts of said apparatus, and (ii) the power supplying condition of the power sources.

2. An apparatus according to claim 1, wherein said first storage means has a continuous storing mode in which the image data are continuously stored and an intermittent storing mode in which the image data are intermittently stored, and wherein said control means controls the timing of starting the movement of said moving part of said second storage means with the start of the storing operation in said second storage means according to (i) the kinds of power sources supplying power to respective parts of the apparatus, (ii) the power supplying condition of the power sources, and (iii) the storing mode of said first storage means.

3. An apparatus according to claim 1, wherein said first storage means includes a memory element.

4. An apparatus according to claim 1, wherein said second storage means includes a hard disk device.

5. An image signal recording apparatus capable of receiving power supply from plural different kinds of power sources to record image signals, comprising:

first storage means for temporarily storing received image data and outputting stored image data;

second storage means, having a moving part, for recording on a recording medium the image data outputted from said first storage means;

instruction means for giving an instruction for starting to enter the image data to said first storage means; and control means for causing said moving part of said second storage means to move after the instruction for starting to enter the image data is given by said instruction means, said control means controlling the timing of starting the movement of said moving part of said second storage means with a start of the storing operation of said second storage means according to the kinds of power sources supplying power to respective parts of the apparatus.

6. An apparatus according to claim 5, wherein said first storage means has a continuous storing mode in which the image data is continuously stored and an intermittent storing mode in which the image data is intermittently stored, and wherein said control means controls the timing of starting the movement of said moving part of said second storage means with the start of the storing operation in said second storage means according to (i) the kinds of power sources supplying power to respective parts of the apparatus and (ii) the storing mode of said first storage means.

7. An apparatus according to claim 5, wherein said first storage means includes a memory element.

8. An apparatus according to claim 5, wherein said second storage means includes a hard disk device.

* * * * *

UNITED STATES PATENT AND TRADEMARK OFFICE
CERTIFICATE OF CORRECTION

PATENT NO. : 5,523,857
DATED : June 4, 1996
INVENTOR(S) : NOBUO FUKUSHIMA

It is certified that error appears in the above-indentified patent and that said Letters Patent is hereby corrected as shown below:

On the title page, item [75]

"Kanagawa-ken," should read --Yokohama,--.

<u>Column 3</u>

Line 7, delete the line in its entirety.

Line 8, "embodiment thereof:" should read --Fig. 1 is a block diagram showing in outline the arrangement of an electronic still video system to which this invention is applied as an embodiment thereof.--

Signed and Sealed this

Twenty-ninth Day of October 1996

*Attest:*

BRUCE LEHMAN

*Attesting Officer*   *Commissioner of Patents and Trademarks*